United States Patent
Collings

(10) Patent No.: US 9,428,703 B2
(45) Date of Patent: Aug. 30, 2016

(54) METHOD AND APPARATUS FOR THE MAKING OF A FUEL

(75) Inventors: Anthony Collings, West Lindfield (AU); Berwyn Collings, legal representative, Turramurra (AU)

(73) Assignee: Ausbiodiesel Pty Ltd, North Sydney, New South Wales ( * ) Notice: Subject to any disclaimer, the term of this patent is extended or adjusted under 35 U.S.C. 154(b) by 133 days.

(21) Appl. No.: 13/320,725

(22) PCT Filed: May 14, 2010

(86) PCT No.: PCT/AU2010/000567
§ 371 (c)(1),
(2), (4) Date: Feb. 1, 2012

(87) PCT Pub. No.: WO2010/130006
PCT Pub. Date: Nov. 18, 2010

(65) Prior Publication Data
US 2012/0125763 A1 May 24, 2012

(30) Foreign Application Priority Data

May 15, 2009 (AU) ................................ 2009902197

(51) Int. Cl.
*B01J 19/10* (2006.01)
*C10G 1/04* (2006.01)
(Continued)

(52) U.S. Cl.
CPC *C10L 1/026* (2013.01); *B01J 8/20* (2013.01); *B01J 8/40* (2013.01); *B01J 19/10* (2013.01);
(Continued)

(58) Field of Classification Search
CPC .......... C10L 1/026; B01J 19/24; B01J 8/40; B01J 8/20; B01J 19/10; C10G 1/045; C10G 3/00; C10G 1/00; C10G 2300/1014; C11C 3/10; Y02E 50/13

USPC ................. 204/157.62, 157.15; 422/128
See application file for complete search history.

(56) References Cited

U.S. PATENT DOCUMENTS 3,346,472 A * 10/1967 Long .................... 204/157.62
3,708,263 A * 1/1973 Boucher ................... 422/20
(Continued)

FOREIGN PATENT DOCUMENTS

CN     01935947 A    3/2007
CN    102119206 A    7/2011
(Continued)

OTHER PUBLICATIONS

Miller, "Effects of a High-Amplitude 1-MHz Standing Ultrasonic Field on the Algae Hydrodictyon," IEEE Trans. on Ultrasonics, Ferroelectrics, and Frequency Control, vol. UFFC-33, No. 2, Mar. 1986, pp. 165-170.*

(Continued)

Primary Examiner — Keith Hendricks
Assistant Examiner — Colleen M Raphael
(74) Attorney, Agent, or Firm — Fish & Richardson P.C.

(57) ABSTRACT

A method (20) of making a fuel is disclosed. The method has a first step of exposing a liquid having biologically derived particles therein to an ultrasonic wave producing cavitation in the liquid and release of a precursor of the fuel from at least some of the particles into the liquid (22). The method also comprises the step of exposing the liquid with another ultrasonic wave insufficient to produce substantial cavitation in the liquid, the another ultrasonic wave providing a reaction between the liquid and the precursor to form the fuel (24).

20 Claims, 4 Drawing Sheets

(51) Int. Cl.
    *C10G 3/00* (2006.01)
    *C11C 3/10* (2006.01)
    *C10G 1/00* (2006.01)
    *C10L 1/02* (2006.01)
    *B01J 8/20* (2006.01)
    *B01J 8/40* (2006.01)
    *B01J 19/24* (2006.01)

(52) U.S. Cl.
    CPC ............... *B01J 19/24* (2013.01); *C10G 1/00* (2013.01); *C10G 1/045* (2013.01); *C10G 3/00* (2013.01); *C11C 3/10* (2013.01); *C10G 2300/1014* (2013.01); *Y02E 50/13* (2013.01); *Y02P 30/20* (2015.11)

(56) References Cited

U.S. PATENT DOCUMENTS

| | | | | |
|---|---|---|---|---|
| 4,438,591 | A * | 3/1984 | Kessler | 47/1.4 |
| 4,879,011 | A * | 11/1989 | Schram | 204/157.62 |
| 5,629,185 | A * | 5/1997 | Stanzl et al. | 435/173.7 |
| 6,440,057 | B1 | 8/2002 | Erguen et al. | |
| 6,736,979 | B2 | 5/2004 | de Meulenaer et al. | 204/157.62 |
| 6,884,900 | B2 | 4/2005 | Maeda et al. | |
| 7,799,233 | B2 * | 9/2010 | Wu et al. | 422/128 |
| 8,183,032 | B2 * | 5/2012 | Frank | 435/257.1 |
| 8,273,694 | B2 * | 9/2012 | Brown et al. | 435/134 |
| 2005/0027137 | A1 | 2/2005 | Hooker | |
| 2008/0086939 | A1 * | 4/2008 | Dunlop | A01H 13/00 47/1.4 |
| 2008/0220515 | A1 * | 9/2008 | McCall | 47/1.4 |
| 2009/0000941 | A1 | 1/2009 | Kropf | |
| 2009/0061493 | A1 | 3/2009 | Trimbur et al. | |
| 2009/0181438 | A1 * | 7/2009 | Sayre | 435/134 |
| 2010/0068772 | A1 * | 3/2010 | Downey | 435/134 |
| 2010/0151540 | A1 * | 6/2010 | Gordon et al. | 435/134 |
| 2010/0175309 | A1 * | 7/2010 | Kozyuk et al. | 44/388 |
| 2010/0311157 | A1 * | 12/2010 | Van Alstyne et al. | 435/294.1 |
| 2011/0095225 | A1 * | 4/2011 | Eckelberry et al. | 204/275.1 |

FOREIGN PATENT DOCUMENTS

| | | | |
|---|---|---|---|
| DE | 10164274 | A1 | 7/2003 |
| DE | 10164274 | B4 | 12/2005 |
| EP | 1964830 | A2 | 9/2008 |
| EP | 2006354 | A2 * | 12/2008 ............... C12P 7/06 |
| EP | 2302019 | A4 | 2/2012 |
| GB | 2419877 | A | 5/2006 |
| JP | 2000300982 | A | 10/2000 |
| WO | 2005016829 | A1 | 2/2005 |
| WO | 2007077302 | A1 | 7/2007 |
| WO | 2007117096 | A1 | 10/2007 |
| WO | 2008034109 | A1 | 3/2008 |
| WO | WO2008034109 | A1 | 3/2008 |
| WO | WO 2008134836 | A2 * | 11/2008 ............... C12P 7/64 |

OTHER PUBLICATIONS

Cravotto et al, "Improved extraction of vegetable oils under high-intensity ultrasound and/or microwaves," Ultrasonics Sonochemistry vol. 15 (2008), pp. 898-902.*

Vyas et al, "A review on FAME production processes," Fuel vol. 89 (2010) pp. 1-9.*

Lu, Qun et al, "Study on extraction of marine algae oil by ultrasonically aided method," Academic J. of Guangdong College of Pharmacy (Guangdong Yaoxueyuan Xuebao), vol. 19, No. 2, Jun. 2003.*

Yang, Zhi-zhong et al, "New technical route for preparation of algae biodiesel—Sonochemistry technique and transesterification catalyzed by nano semiconductive metal oxides," Guangdong Youse Jinshu Xuebao, vol. 2, No. 4, Dec. 2008, pp. 387-389.*

Cravotto et al "Improved extraction of vegetable oils under high-intensity ultrasound and/or microwaves," Ultrasonics Sonochemistry 15 (2008) pp. 898-902.*

Stavarache, C, "Conversion of Vegetable Oil to Biodiesel Using Ultrasonic Irradiation", Chemistry Letters, vol. 32, No. 8 (pp. 716-717), Apr. 28, 2003.

Authorized Officer Thanh-Tam Chau, International Search Report in PCT/AU2010/000567, mailed Jun. 30, 2010, 4 pages.

Supplementary European Search Report for European Application No. EP 10 77 4435, mailed Jan. 8, 2014.

Ehimen, E.A., et al., "Use of Ultrasound and Co-Solvents to Improve the In-Situ Transesterification of Microalgae Biomass," Procedia Environmental Sciences 15 (2012) 47-55.

Notice of First Office Action for Chinese Application No. 201080026162.2, mailed Aug. 26, 2013.

Notice of Reasons for Rejection for Japanese Application No. 2012-510072, mailed Oct. 1, 2013.

* cited by examiner

METHOD AND APPARATUS FOR THE MAKING OF A FUEL

FIELD OF THE INVENTION

The present invention generally relates to a method and apparatus for making a fuel, and particularly but not exclusively to a method and apparatus for making a fuel from biologically derived particles, such as algae, using ultrasonic technology.

BACKGROUND OF THE INVENTION

Biodiesel made from biological material, such as algae, may be used in vehicles, space heating and generally any application where a diesel derived from fossil sources, such as mineral oil or coal, is used. Biodiesel is typically produced from oils or fats from the biological material using a transesterification process. Biodiesel has a composition that is typically similar to fossil diesel.

Biodiesel derived from algae has recently attracted great interest because algae can, for example, be grown in salt, brackish or waste water and production does not have to occupy arable land. Algae can produce more energy per unit area of land than most other crops.

The use of ultrasonic waves in the production of biofuel is known, but has been limited to mixing and breaking up the oils and fats during the step of transesterification.

A reference herein to prior art is not an admission that the prior art forms part of the common general knowledge in the art in Australia or any where else in the world.

SUMMARY OF INVENTION

Some embodiments of the invention may provide a method of making a fuel having two steps, each step having different ultrasonic wave treatments. Advantageously, an embodiment of the method may be relatively efficient and fast compared with prior art. The method may, in an embodiment, involve the use of a corresponding apparatus for the production of fuel.

According to a first aspect of the invention there is provided a method of making a fuel, the method comprising the steps of:

exposing a liquid having biologically derived particles therein to an ultrasonic wave producing cavitation in the liquid and release of a precursor of the fuel from at least some of the particles into the liquid; and exposing the liquid with another ultrasonic wave, the other ultrasonic wave promoting a reaction between the liquid and the precursor to form the fuel.

In an embodiment, at least some of the particles are algal particles. Algal particles are, in the context of this specification, particles that are or have been derived from algae cells. At least some of the algae may belong to the genus *Chlorella*. The algae may be diatom. The algae may be cyanobacteria. Substantially all of the particles may be algal particles.

In an embodiment, the other ultrasonic wave is insufficient to produce cavitation in the liquid.

Some embodiments have the advantage that separating the ultrasonic treatment step of releasing the precursor and the other ultrasonic treatment step of promoting the reaction allows tailoring of each steps' ultrasonic parameters. For example, the cavitation, which in some embodiments breaks up the biologically derived particles, requires the ultrasonic wave to have a relatively high power. But cavitation may inhibit the reaction forming the fuel and so the other ultrasonic wave preferably has a relatively low power. The period of time for each ultrasonic treatment step may also vary significantly. Separation of the steps may allow, for example, each step to be performed in a separate vessel or component, each vessel or component being arranged for improved performance of its respective step and to maintain a constant volumetric flow rate.

In an embodiment, at least some of the particles are algal particles. Algal particles are, in the context of this specification, particles that are or have been derived from algae cells. At least some of the algae may belong to the genus *Chlorella*. The algae may be diatom. The algae may be cyanobacteria. Substantially all of the particles may be algal particles.

In an embodiment, the ultrasonic waves producing cavitation have an intensity of around 50 W/cm$^2$ or higher. The intensity may be 100 W/cm$^2$ or higher. The intensity may be 200 W/cm$^2$ or higher. Cavitation may occur over a period of 1 to 100 seconds. The period may be between 1 and 5 seconds. The period may be around 15 seconds. The cavitation may be performed at pressures less than 1 bar. The cavitation may be performed at a temperature less than 20 degrees centigrade.

Some species of algae are very efficient at converting sunlight into stored chemical energy in the form of the precursor. Some species of algae grow very rapidly providing a ready supply of feedstock for the process. The algae may be grown in water, contained in ponds or vats for example. The algae may be separated from the water by filtration, for example. The algae may be dried. The liquid may be mixed with the algae to form slurry. Some species of algae may be grown using carbon dioxide generated by an industrial facility, such as a coal fired power plant or cement manufacturing plant, effectively reducing the amount of carbon dioxide released into the atmosphere which is a greenhouse gas.

In an embodiment, the particles may comprise dead cells. The dead cells may be at least in part processed. The dead cells may comprise the algal particles.

Alternatively, at least some of the particles may be derived from any plant suitable for the production of the fuel. For example, the plant may be any one of oil palm, soybean, jatropha, or pongamia pinnata.

Alternatively, at least some of the particles may be derived from an animal, such as livestock.

In an embodiment, the liquid comprises alcohol. The alcohol may comprise methanol. The alcohol may comprise ethanol. The alcohol may comprise any other suitable alcohol. The alcohol may have 10g or more of the particles per liter. The alcohol may have 100-400 g of the particles per liter. The alcohol may have 150-250 g of the particle per liter.

In an embodiment, the reaction comprises replacement of a triglyceride in the precursor with either a methyl or ethyl ester. The reaction may also produce glycerol. The method may comprise adding a metal hydroxide, such as sodium or potassium hydroxide, to the liquid, the metal hydroxide catalysing the reaction. The alcohol may contain 20-40 g/liter of the metal hydroxide. The reaction may be performed at a pressure of 1-6 bars of pressure, preferably around 3 bars. The ester may constitute the fuel. Alternatively, the glycerol may constitute the fuel.

In an alternative embodiment, the method may comprise adding one or more of an acid, a methoxide or ethoxide, to the liquid, catalyzing the reaction.

In an embodiment, the method comprises the step of separating the ester. Separating the ester may also comprise separating the glycerol. The step of separating the ester may comprise dissolving the ester in a solvent. The solvent may be hexane. The method may comprise the step of fractional separation of the ester from the solvent.

According to a second aspect of the invention there is provided an apparatus for making a fuel, the apparatus being arranged to expose a liquid having biologically derived particles therein to an ultrasonic wave producing cavitation in the liquid and release of a precursor of the fuel from at least some of the particles into the liquid, and also being arranged to expose the liquid with another ultrasonic wave, the other ultrasonic wave promoting a reaction between the liquid and the precursor to form the fuel.

In an embodiment, the other ultrasonic wave is insufficient to produce substantial cavitation in the liquid.

According to a third aspect of the invention there is provided an apparatus for making a fuel, the apparatus comprising:

a first component arranged to expose a liquid having biologically derived particles therein to an ultrasonic wave producing cavitation in the liquid and release of a precursor of the fuel from at least some of the particles into the liquid; and a second component being arranged to expose the liquid with another ultrasonic wave, the other ultrasonic wave promoting a reaction between the liquid and the precursor to form the fuel.

In an embodiment, the other ultrasonic wave is insufficient to produce substantial cavitation in the liquid.

In an embodiment, the second component is in fluid communication with the first component.

In an embodiment, the first and second components each comprise a respective vessel for containing the liquid. The vessels may be connected by a passageway for communication of the liquid between the respective vessels.

In an embodiment, each component comprises a source of the respective ultrasonic waves. The first component may comprise a source of relatively high power ultrasonic waves. The second component may comprise a source of relatively low power ultrasonic waves.

In an embodiment, the apparatus comprises a flow controller directing the liquid through the first component and then the second component. The flow controller may comprise a pump. The flow controller may comprise a valve. The valve may comprise a check valve.

BRIEF DESCRIPTION OF THE FIGURES

In order to achieve a better understanding of the nature of the present invention embodiments will now be described, by way of example only, with reference to the accompanying figures in which.

DETAILED DESCRIPTION OF EMBODIMENTS OF THE INVENTION

One embodiment of the invention turns algae, a type of biologically derived particle, into a fuel with qualities similar to the regular diesel fuel which is derived from fossil sources such as crude oil and coal. Algae is a biological material generally obtainable from sustainable sources. Because of these reasons the fuel may be labelled as a biofuel, and more specifically as a biodiesel. The biodiesel may be used as either a complete or partial substitute for fossil diesel, and may be mixed with fossil diesel to create blends such as B20, a mix of 20% biodiesel and 80% fossil diesel. In some other embodiments, the feedstock may comprise any suitable type of biological material, such as for example animal fat or oil, minced or crushed oil seeds such as from canola or sunflower crops, processed soybean, pennycress, Jatropha, mustard, flax, palm oil, hemp, vegetable oil, and salicornia bigelovii. All of these biological materials may present as particles.

Figure 1:
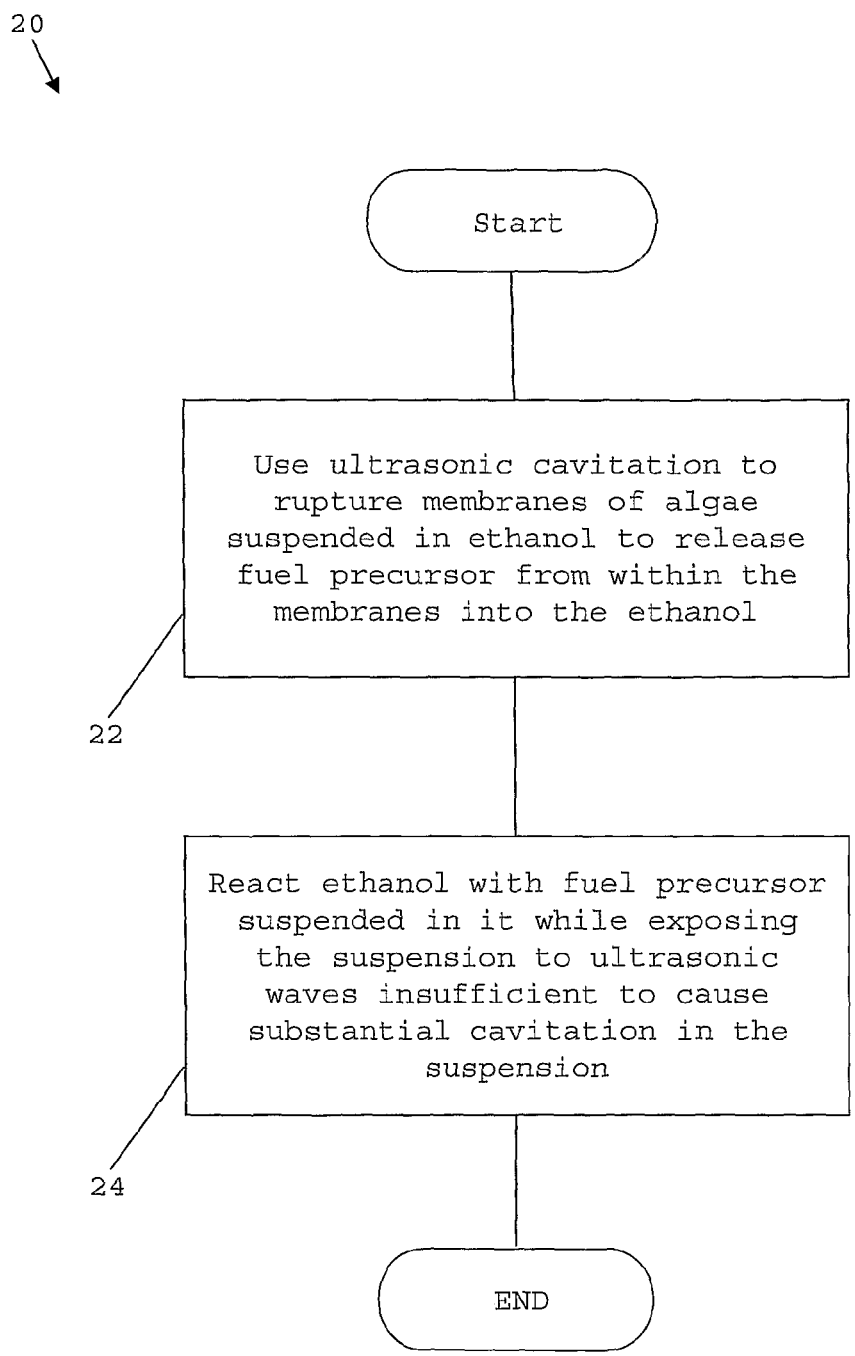
FIG. 1 shows a flow diagram of one embodiment of a method for making a fuel.

FIG. 1 shows a flow diagram of one embodiment of a method of making a fuel, generally indicated by the numeral 20. In one step 22, ultrasonic cavitation is used to rupture the membranes of algae suspended in a liquid alcohol, in this embodiment ethanol. This step may be labeled as ultrasonic digestion. Any suitable alcohol, such as methanol, could be alternatively used in place of ethanol. A fuel precursor leaves the ruptured membrane and enters the alcohol. In this example, the fuel precursor comprises one or more lipids produced by each of the algal cells while alive. In another step 24, the fuel precursor is reacted with the ethanol to produce a mixture comprising the biodiesel. This step 24 may, in this embodiment at least, be labeled as ultrasonic esterification. The biodiesel may then be separated from the resultant mixture. The rate of the reaction is accelerated by exposing the suspension to an ultrasonic wave that is insufficient to cause substantial cavitation in the suspension. In an alternative embodiment, the wave is insufficient to cause any cavitation. As the ultrasonic power is increased from zero, the rate of the reaction will generally increase up to approximately the threshold power at which cavitation occurs in the liquid, after which, the rate of the reaction will start to decrease with further increases in ultrasonic power. This may be because the propagation of the ultrasonic waves is impeded by the presence of the cavities within the liquid limiting the penetration of the waves into the liquid. Cavitation may also directly adversely effect the reaction. Instead, the applied ultrasonic power during the esterification step may be chosen to cause microscopic stirring within the liquid, the breaking of liquid boundary layers around the algae and possibly other chemical-physical mechanisms that enhance the reaction rates. A very low level of cavitation may, however, create useful local stirring which may accelerate the reaction.

In this embodiment, there is around 150-250 g of algae per liter of alcohol, which may provide a sufficient process throughput without the problems of a thick and reluctant suspension that may be associated with greater concentrations. However, in other embodiments the alcohol may have anything from 10g or more of the algae per liter, up to 400 g of the particles per liter.

In this embodiment, the reaction 24 replaces a triglyceride in the lipid fuel precursor with either a methyl or ethyl ester, depending on whether methanol or ethanol respectively is used. Other groups may be substituted if other alcohols are used. The reaction may be catalysed by the addition of a catalyst, such as a metal hydroxide (such as potassium hydroxide, or alternatively an acid, methoxide or ethoxide), to the ethanol either before or after the step of ultrasonic cavitation. The reaction also produces glycerol which is a useful product when separated from the resultant mixture, and may itself be used as a fuel. A solid residue constituting the husk and other remnants of the algae is also produced. The solid residue may be separated and used, for example, as a fertilizer or filler material. Generally though, it is the separated ester that constitutes the biodiesel.

In embodiments where non algal feedstock is used, the ultrasonic digestion may mechanically break other structures such as the husks of seeds, or act to disperse fat or oil particles, for example.

Figure 2:
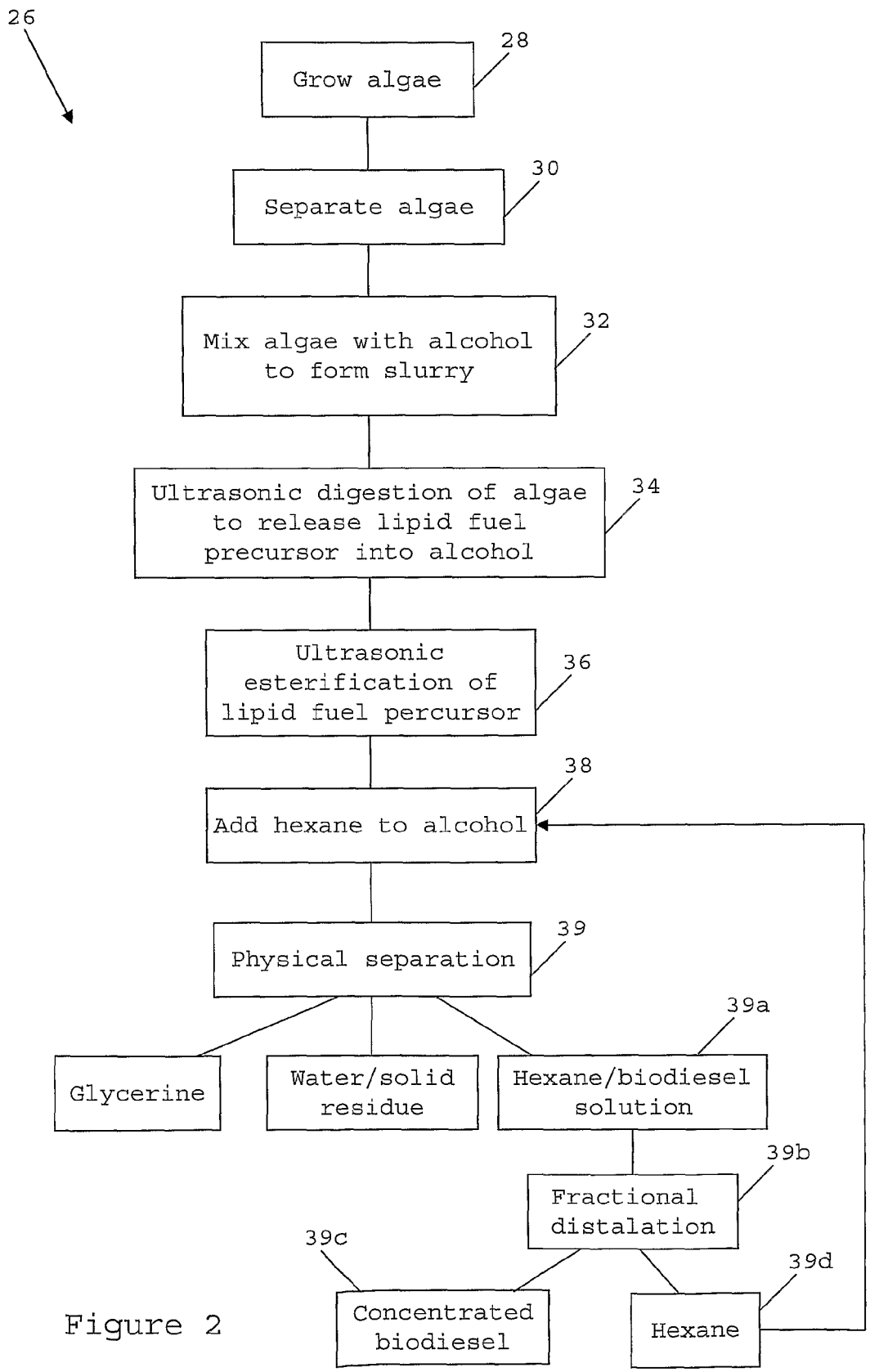
FIG. 2 shows a flow diagram of another embodiment of a method for making a fuel.

FIG. 2 shows a flow diagram of another embodiment of a method 26, similar to that shown in FIG. 1, and incorporating both the ultrasonic digestion step 34 and the ultrasonic esterification step 36 of FIG. 1 (steps 22 and 24 respectively). This embodiment 26 includes the presteps of growing the algae, for example, in water contained in a pond and then separating the algae from the water using, for example, filtration of the water through a fine mesh or membrane as appropriate. There algae may, in some embodiments, be dried before adding it to the alcohol to form the slurry. This embodiment also includes the post steps 38,39 of adding hexane 38 or any other suitable solvent to the mixture and separating the mixture into its component phases. The ester dissolves into the hexane and the resulting solution forms a layer phase that can be separated through a pouring or any other suitable physical separation process 39, for example. The biodiesel 39c is then separated from the hexane 39d by, at least in this embodiment, a fractional distillation 39b. The separated hexane step 39d may then be reintroduced into the process at step 38.

Figure 3:
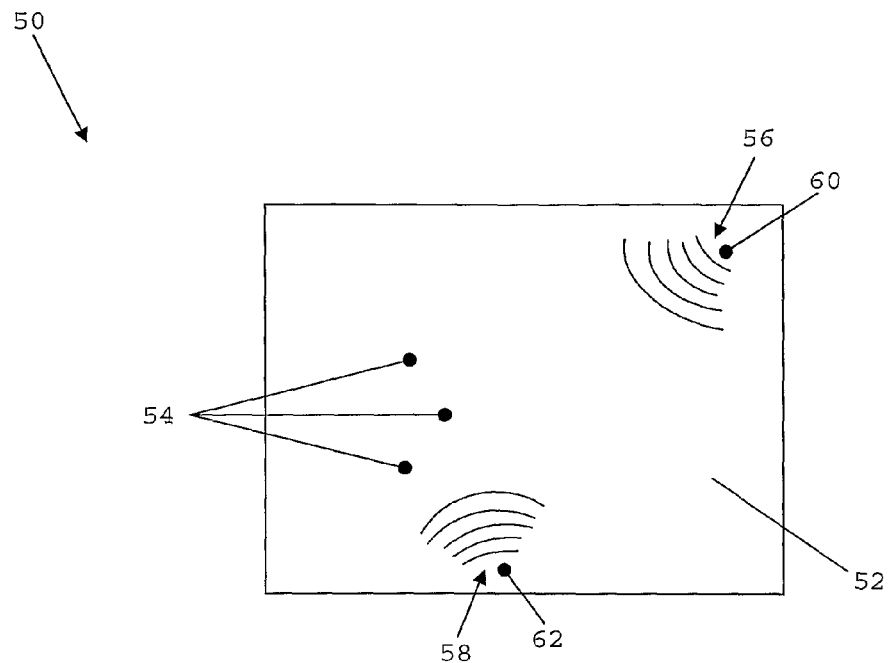
FIG. 3 shows a schematic diagram of one embodiment of an apparatus for making a fuel.

FIG. 3 shows one embodiment of an apparatus 50 for the making of a fuel. The apparatus 50 may be suited to the batch production of the fuel. The ultrasonic digestion 22 and esterification 24 steps depicted in FIG. 1 may, for example, be performed using this or similar apparatus 50. The apparatus 50 is arranged to expose a liquid 52 contained in the apparatus 50 and having biologically derived particles 54 therein to ultrasonic waves 56 producing cavitation in the liquid 52 and release of a precursor of the fuel from at least some of the particles 54 into the liquid 52. The apparatus is also arranged to expose the liquid 52 with another ultrasonic wave 58, which may originate from the same or different ultrasonic wave generation means, of insufficient power (or alternatively ultrasonic wave intensity) to produce cavitation in the liquid. The another ultrasonic wave 58 promotes a reaction between the liquid 52 and the precursor to form the fuel. The ultrasonic waves 56 and 58 may originate from different ultrasonic sources such as 60,62 immersed in the liquid. An example of a suitable source is the UIP1000hd ultrasonic probe manufactured by Hielscher Ultrasonics, Germany, running at a ultrasonic frequency of 20 kHz and having a nominal maximum power of 1 kW, which should be sufficient to process up to 20-100 l/hr of algal slurry. The probe may have a titanium tip, which resists wear, is an efficient wave guide material, and is relatively chemically inert. However, in some other embodiments the tip may be fabricated of stainless steel or any other suitable material, for example. Other sources of higher or lower power may be used to scale the production up or down as required. More than one probe may also be used to scale up the applied ultrasonic power or configure the distribution of the ultrasonic waves within the apparatus 50. In embodiments were a single source is used, the ultrasonic digestion step may be realised by driving the probe at high powers to achieve cavitation, and then the ultrasonic power subsequently reduced to below the cavitation threshold during the esterification step.

Figure 4:
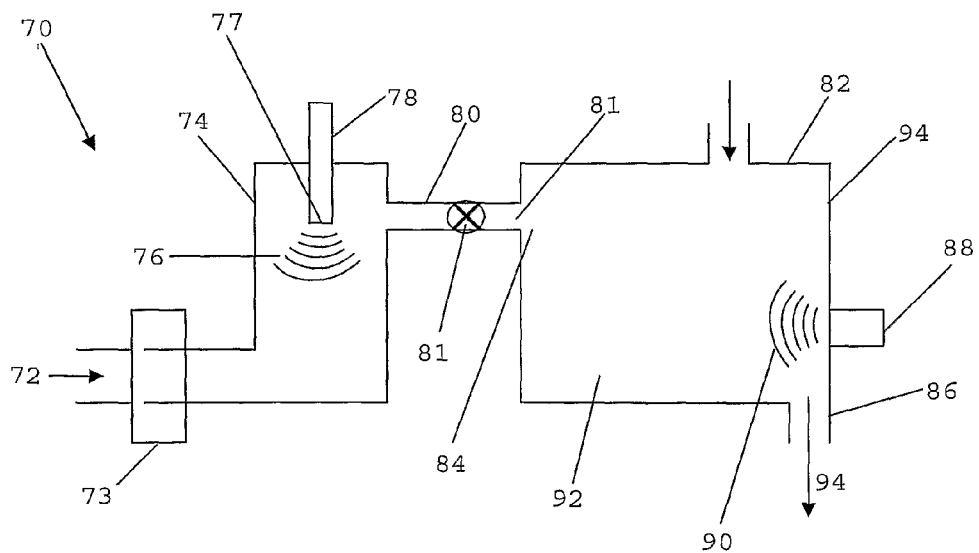
FIG. 4 shows a schematic diagram of another embodiment of an apparatus for making a fuel.
Figure 5:
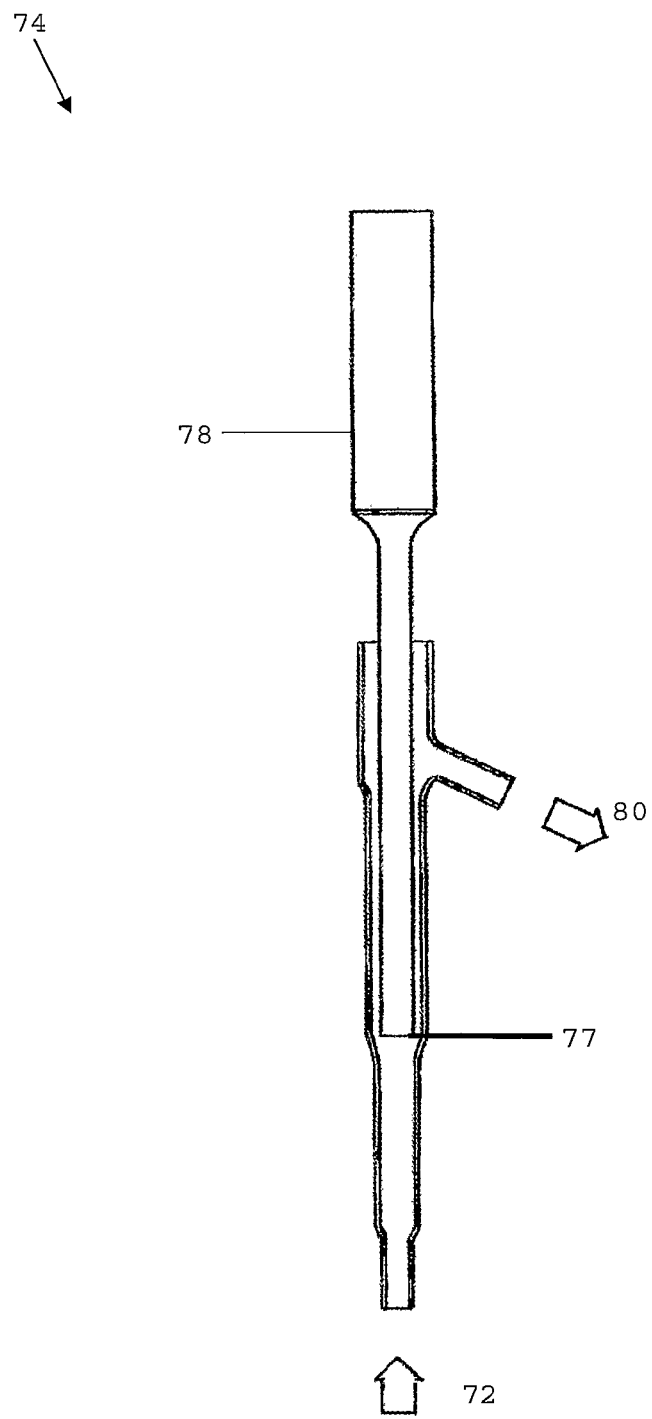
FIG. 5 shows an alternative embodiment of a flow cell useable in the embodiment of FIG. 4.

FIG. 4 shows another embodiment of an apparatus 70 for making a fuel. The apparatus 70 may be suitable for a continuous or semi-continuous production of the fuel. A flow of the feedstock 72, in this embodiment an algae/alcohol slurry, enters a first component in the form of a vessel, cell or reactor 74, in this embodiment in the form of a flow cell. A pump 73 controls the flow through the apparatus. An ultrasonic digestion zone 76 within the first component is created by relatively intense ultrasonic waves from the tip 77 of an ultrasonic probe 78 penetrating into the flow cell 74. Ultrasonic cavitation occurs in the zone 76, rupturing the algae particles to release lipid precursors of the fuel from at least some of the particles into the alcohol. FIG. 5 shows another embodiment of the flow cell 74, in which similar or like components are similarly indicated. The width of the probe tip 77 is wider than the inlet diameter which ensure all of the slurry is treated.

Referring again to FIG. 4, the digested slurry then flows through a passageway 80 connecting the first component 74 with a second component in the form of a vessel, cell or reactor 82, via inlet 81. The vessel 82 is also provided with an outlet 86 for flow of the resultant mixture out of the vessel 82 into a holding tank, for example. The passageway 80 provides fluid communication between the first 74 and second 82 components. A check-valve 81 may be placed in the passageway 80. The second component 82 has an external wall 94 to which an ultrasonic source in the form of a piezoelectric transducer 88 is attached by, for example, an epoxy resin or mechanical clamping arrangement. In this case, the vessel 82 itself becomes the source of the ultrasonic waves 90. The ultrasonic transducer 88 emits another ultrasonic wave that travels through the wall 94 of the component into the contents 92 of the vessel 82, which is the digested slurry 92. The another ultrasonic wave 90 is insufficient to produce cavitation in the liquid, but rather has parameters that does promote a reaction within the vessel 82 between the liquid and the precursor to form the fuel. The second vessel 82 may be generally cylindrical, and have a cross section that is any one of circular, square, pentagonal, hexagonal or any other shape. The ratio of the volumes of each of the first 74 and second 82 vessels may be selected to give each a different fluid residence or transit time. For example, the fluid may spend a few seconds in the first vessel 74 but several minutes in the second vessel 82 which has a volume many times that of the first. It will be appreciated that the first and second components may generally each be any suitable vessel, such as a pipe, drum or cylinder or combination of these, for example. The vessels may be fabricated from any suitable material such as stainless steel, or high-density polyethylene.

EXAMPLE

In an example, separated and dry algae is provided and suspended in methanol, 200 g of algae per liter. Dry algae has less water which may slow down the transesterification reaction.

The suspension is subjected to a first high power ultrasound regime of an intensity of around 100 W/cm$^2$ or higher to cause strong cavitation which ruptures at least some of the algal membranes and the release of lipids contained within the membranes. The ultrasonic reactor is designed to ensure that all algae pass through the zone of most intense cavitation with a residence time of 15 seconds in this zone. The residence time, at least for another example, may be reduced to a few seconds.

The transesterification reaction involves the replacement of triglycerides of the released lipids with methyl esters with glycerol as a by-product. This reaction is catalysed by adding 20-40 g/L sodium or potassium hydroxide to the suspension. This reaction may be expedited by the application of a second ultrasound regime selected not to cause cavitation which may slow the reaction. The rate of the transesterification reaction may be increased by one to two orders of magnitude by the appropriate ultrasound regime.

The glycerine and methyl ester mixture is then separated using, for example, the method disclosed in the international patent specification WO8401527A by Jewett-Norman et al. The glycerine is drawn off as a by-product.

The methyl ester is purified by the addition of a hydroalcoholic solution and then hexane. The hexane phase contains most of the oil and the aqueous phase the residue impurities. To ensure that all the oil is extracted, these phases must be well mixed but an emulsion may form slowing the separation of the two phases. This separation can again be expedited using the Jewett-Norman technique to obtain a purified extract and a hydroalcoholic phase.

Now that embodiments have been described, it will be appreciated that some embodiments may have some of the following advantages:

Separating the ultrasonic digestion and ultrasonic assisted esterification steps may allow optimisation of the ultrasonic waves used in each step, increasing fuel production; and embodiments of the method and apparatus may have an industrial scale for commercial production of fuel.

Some variations on the specific embodiments include:
either or both of the first and second components of the apparatus may comprise a flow cell;
either or both of the first and second components of the apparatus may comprise two opposing sonicated metal plates, driven at different frequencies such as 16 KHz and 20 KHz;
either or both of the ultrasonic waves may be pulsed for a more pronounced effect which may also save energy;
either or both of the first and second components of the apparatus may comprise a Telsonic tubular resonator, or a Martin Walter Push-Pull system, or analogous resonator;
the high power probes may be replaced with an array of lower power ultrasonic sources;
the ultrasonic waves may be focused, increasing the ultrasonic intensity;

It will be appreciated that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of making a fuel, the method comprising the steps of:
(i) exposing a liquid having algal particles therein to a first ultrasonic wave having parameters that produce cavitation in the liquid, the cavitation causing rupture of at least some of the algal particles to thereby release a precursor of the fuel from said at least some of the algal particles into the liquid, wherein the first ultrasonic wave producing cavitation has an intensity of around 50 W/cm$^2$ or higher; and
(ii) exposing the liquid with a second ultrasonic wave, the second ultrasonic wave having parameters that promote a reaction between the liquid and the precursor to form the fuel.

2. A method defined by claim 1 wherein the second ultrasonic wave is insufficient to produce cavitation in the liquid.

3. A method defined by claim 1 wherein the cavitation causes rupture of the particles and release of a lipid contained in the particles, the lipid constituting the precursor of the fuel.

4. A method defined by claim 1 wherein the liquid comprises alcohol.

5. A method defined by claim 1 wherein the reaction comprises replacement of a triglyceride in the precursor with either a methyl or ethyl ester.

6. The method of claim 1 wherein exposing the liquid having algal particles therein to the ultrasonic wave comprises:
exposing a liquid having algal cells therein to an ultrasonic wave producing cavitation in the liquid, the cavitation causing rupture of at least some of the algal cells to thereby release a precursor of the fuel from said at least some of the algal cells into the liquid.

7. The method of claim 1 wherein exposing the liquid having algal particles therein to the first ultrasonic wave comprises:
exposing the liquid having algal particles therein to the first ultrasonic wave at a pressure of less than 1 bar.

8. The method of claim 1 wherein exposing the liquid having algal particles therein to the first ultrasonic wave comprises:
exposing the liquid having algal particles therein to the first ultrasonic wave at a temperature less than 20 degrees centigrade.

9. The method of claim 1 further comprising:
forming a mixture comprising alcohol and algae cells;
wherein exposing the liquid having algal particles therein to the first ultrasonic wave comprises exposing the mixture to the first ultrasonic wave.

10. The method of claim 9 further comprising:
obtaining a liquid comprising algae cells in water;
extracting the algae cells from the liquid;
at least partially drying the algae cells; and
wherein forming the mixture comprises forming a mixture comprising alcohol and the at least partially dried algae cells.

11. The method of claim 9 wherein forming the mixture comprises forming a mixture comprising 100 grams to 400 grams of algal cells per liter of alcohol.

12. The method of claim 9 wherein forming the mixture comprises forming a mixture comprising 150 grams to 250 grams of algal cells per liter of alcohol.

13. The method of claim 9 further comprising adding a metal hydroxide to the mixture;
wherein exposing the liquid with the second ultrasonic wave comprises exposing the mixture to the second ultrasonic wave after adding the metal hydroxide to the mixture.

14. The method of claim 13 wherein adding the metal hydroxide to the mixture comprises adding sodium hydroxide or potassium hydroxide to the mixture.

15. The method of claim 13 wherein adding the metal hydroxide to the mixture comprises adding a metal hydroxide to achieve a concentration of between 20 grams and 40 grams of metal hydroxide per liter of alcohol.

16. The method of claim 9 further comprising adding an acid, a methoxide, or an ethoxide to the mixture;
   wherein exposing the liquid with the second ultrasonic wave comprises exposing the mixture to the second ultrasonic wave after adding the acid, the methoxide, or the ethoxide to the mixture.

17. The method of claim 1 wherein exposing the liquid with the second ultrasonic wave comprises exposing the liquid with the second ultrasonic wave at a pressure between 1 bar and 6 bars.

18. The method of claim 1 wherein exposing a liquid having algal particles therein to the first ultrasonic wave or exposing the liquid with the second ultrasonic wave comprises:
   placing the liquid between two opposing metal plates; and
   applying ultrasound by driving the opposing metal plates at different frequencies.

19. The method of claim 1 further comprising:
   adding hexane to the liquid after exposing the liquid with the second ultrasonic wave;
   separating a hexane solution from the liquid; and
   separating biodiesel from the hexane solution using fractional distillation.

20. The method of claim 1, wherein the first ultrasonic wave producing cavitation has an intensity of 100 W/cm$^2$ or higher.

* * * * *